United States Patent [19]

Yoshida

[11] 3,764,089

[45] Oct. 9, 1973

[54] RECORDING AND REPRODUCING APPARATUS USING MAGNETIC CASSETTE

[75] Inventor: Kenji Yoshida, Tokyo, Japan

[73] Assignee: Sony Corporation, Tokyo, Japan

[22] Filed: Sept. 10, 1971

[21] Appl. No.: 179,505

[30] Foreign Application Priority Data

Sept. 11, 1970 Japan ................................ 45/80223
Dec. 11, 1970 Japan ................................ 45/110277

[52] U.S. Cl. .................................. 242/198, 274/4 F
[51] Int. Cl.... G03b 1/04, G11b 15/32, G11b 23/04
[58] Field of Search ............................ 242/197–200; 274/4 C, 4 F; 179/100.2 Z

[56] References Cited

UNITED STATES PATENTS

| | | | |
|---|---|---|---|
| 2,969,929 | 1/1961 | Rudzitis | 274/4 E |
| 3,146,316 | 8/1964 | Knoth | 179/100.2 Z |
| 3,394,898 | 7/1968 | Laa | 242/198 |

*Primary Examiner*—Leonard D. Christian
*Attorney*—Lewis H. Eslinger et al.

[57] ABSTRACT

An apparatus for recording and/or reproducing signals on a magnetic tape contained in a cassette has a chassis with a tape drive, such as, a capstan and take-up and supply reel driving shafts, engageable with a cassette from below the latter, a movable frame mounted on the chassis for movement relative to the latter in a substantially inclined path that extends downwardly and towards the front of the chassis from an elevated position to a lowered operative position, cassette holding guides on the frame opening at the front of the latter for slidably receiving a cassette above the tape drive when the frame is in its elevated position, cassette locating elements on the chassis engageable with a cassette in the guides with the frame in its elevated position to locate the cassette in vertical registry with the tape drive and constraining the cassette to move vertically downward into engagement with the tape drive upon shifting of the frame in the inclined path to its lowered operative position, and a magnetic head on the frame spaced rearwardly from a cassette in the guides when the frame is in its elevated position and being engaged with the tape in the cassette upon shifting of the frame to the lowered position. The apparatus further has a single control lever by which a latch holding the frame in its lowered operative position may be released for return of the frame to its elevated position with automatic ejection of the cassette from the holding guides, and also by which the operating mode of the tape drive may be selected among normal forward drive, fast forward drive and rewind drive. There is also provided a device whereby a cassette is automatically ejected from the holding guides in the event that the cassette is incorrectly inserted therein.

13 Claims, 13 Drawing Figures

Patented Oct. 9, 1973

3,764,089

9 Sheets-Sheet 4

Patented Oct. 9, 1973

3,764,089

9 Sheets-Sheet 9

RECORDING AND REPRODUCING APPARATUS USING MAGNETIC CASSETTE

This invention relates generally to apparatus for recording and/or reproducing signals on a magnetic tape contained in a cassette, and more particularly is directed to an improved cassette loading mechanism by which a cassette is conveniently operatively positioned in such apparatus and ejected therefrom.

Generally, in apparatus for recording and/or reproducing signals on a magnetic tape contained in a cassette, the cassette is inserted horizontally into the apparatus at a level above the operative position of the cassette and, after such insertion, is vertically depressed by the user so as to attain the operative position at which the cassette is then fixedly held. Such movements of the cassette en route to its operative position are necessary in order to permit the entry into corresponding openings of the cassette of the tape driving capstan and the reel driving shafts which extend upwardly from the chassis or base plate of the recording and/or reproducing apparatus.

The previously proposed cassette loading mechanisms, for example, as disclosed in U.S. Pats. No. 3,146,316, No. 3,385,534, and No. 3,494,572, have been undesirably bulky and complex in their structure and operation, and further have required the exertion of undesirably large forces for inserting a cartridge or cassette and locating the latter at its operative position, or for ejecting the cassette from the loading mechanism.

Accordingly, it is an object of this invention to provide a recording and/or reproducing apparatus of the described type with a cassette loading mechanism by which a cassette is easily and simply disposed in its required operative position, and further by which, when desired, the cassette is easily ejected.

Another object is to provide a cassette loading mechanism, as aforesaid, in which a relatively small manually applied force is sufficient to initiate the ejection of a cassette.

Still another object is to provide a cassette loading mechanism that permits the quick insertion and ejection of the cassette.

Still another object is to provide a cassette loading mechanism which is compact so as to permit reduction of the overall dimensions of the recording and/or reproducing apparatus in which such mechanism is incorporated.

A further object is to provide a cassette loading mechanism with a device which prevents the movement of a cassette to its operative position in the event that the cassette is incorrectly inserted.

A still further object is to provide a cassette loading mechanism with a cassette ejecting device for propelling a cassette substantially out of the loading mechanism when an injecting control member is actuated or when a cassette is incorrectly inserted into the loading mechanism.

A still further object is to provide an apparatus for recording and/or reproducing signals on a magnetic tape contained in a cassette with a cassette loading mechanism having simplified controls, and particularly in which a single control member is employed for initiating the ejection of a cassette from the loading mechanism, and also for selecting the mode of operation of the tape drive from among forward operation at normal speed, fast forwarding operation and rewinding operation.

In accordance with an aspect of this invention, an apparatus for recording and/or reproducing signals on a magnetic tape contained in a cassette comprises a chassis having tape drive means projecting upwardly therefrom for engagement with a cassette from below the latter, a movable frame mounted on the chassis for movement relative to the latter in a substantially inclined path that extends downwardly and towards the front of the chassis from an elevated position to a lowered position, cassette holding means on the frame opening at the front of the latter for slidably receiving a cassette that is horizontally inserted therein and for disposing such cassette at a level above the tape drive means when the frame is in its elevated position, means for shifting the frame from its elevated position to the lowered operative position, and cassette locating means on the chassis engageable with a cassette slidably received in the holding means with the frame in its elevated position for disposing the cassette in vertical registry with the tape drive means therebelow and in forwardly spaced relation to a magnetic head fixed on the frame, such cassette locating means constraining the cassette to move vertically downward into engagement with the tape driving means upon shifting of the frame to its lowered operative position where the magnetic head is engaged with the tape in the cassette.

The above, and other objects, features and advantages of this invention, will be apparent in the following detailed description of an illustrative embodiment thereof which is to be read in connection with the accompanying drawings, wherein.

Figure 1:
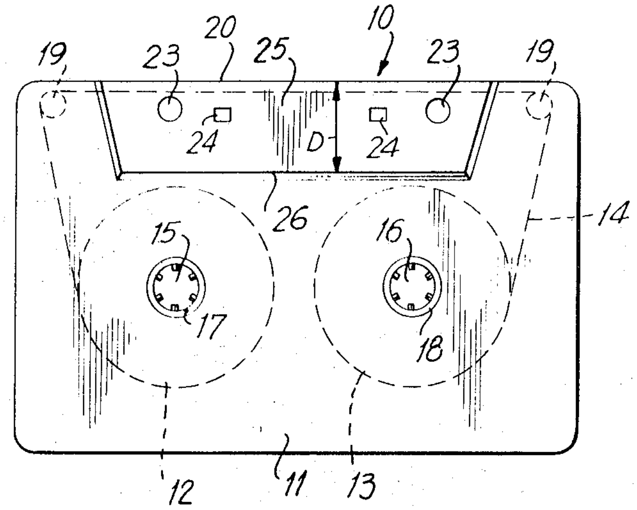
FIG. 1 is a plan view of a cassette of the type that is intended to be employed in a recording and/or reproducing apparatus having a cassette loading mechanism in accordance with this invention.
Figure 2:
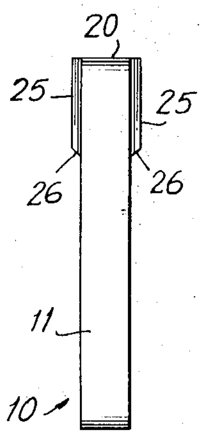
FIGS. 2 and 3 are respectively an end elevational view and a longitudinal edge elevational view of the cassette shown on FIG. 1.
Figure 3:
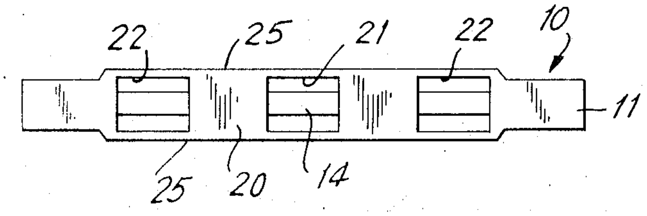

Referring to the drawings in detail, and initially to FIGS. 1, 2 and 3, it will be seen that a cassette 10 of a conventional type intended for use in a magnetic recording and/or reproducing apparatus having a cassette loading mechanism according to this invention generally comprises a substantially rectangular casing 11 containing a pair of rotatable reels 12 and 13 and a tape 14 which is wound on reels 12 and 13 and extends therebetween. The reels 12 and 13 are formed with reel shaft apertures 15 and 16 for the reception of reel shafts, and apertures 17 and 18 are formed in the top and bottom surfaces of casing 11 to expose the reel shaft apertures 15 and 16, respectively. The magnetic tape 14 extending between reels 12 and 13 passes around guides 19 adjacent two of the corners of casing 11 so as to run along one of the longitudinal edge walls 20 of casing 11, which wall 20 is formed with a central aperture 21 and a pair of apertures 22 spaced from aperture 21 at opposite sides of the latter so as to expose the adjacent run of tape 14.

Apertures 23 are formed in the top and bottom of casing 11 and are located inwardly with respect to the run of tape 14 which is exposed at apertures 22 of edge wall 20 and are intended to selectively receive a capstan for driving the tape. Further, as shown, a pair of apertures 24 are symmetrically located in the top and bottom of casing 11 and are intended to receive locating pins, as hereinafter described, by which the cassette is positively located with respect to a capstan engageable in one or the other of the apertures 23, reel shafts engageable with the reel shaft apertures 15 and 16, and a magnetic head engageable with the tape 14 exposed at aperture 21. It is further to be noted that the conventional cassette 10 has raised plateaus 25 projecting from the top and bottom surfaces of casing 11 along the longitudinal edge wall 20, and that each of the plateaus 25, at the side thereof remote from edge wall 20, defines a shoulder 26.

Figure 4:
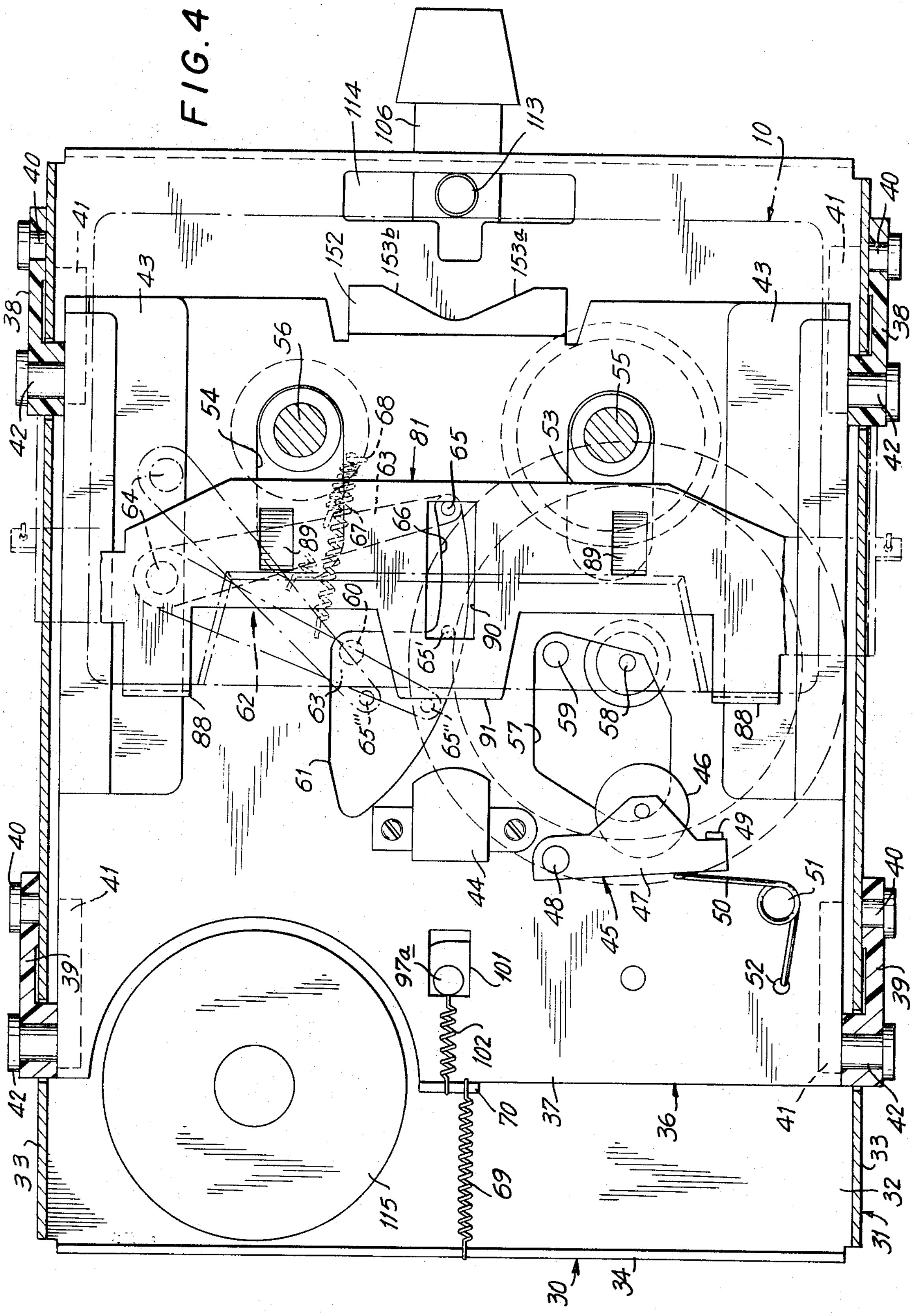
FIG. 4 is a top plan view of a recording and/or reproducing apparatus having a cassette loading mechanism in accordance with an embodiment of this invention, and with certain of the parts thereof being broken away to better disclose underlying elements of the mechanism.
Figure 5:
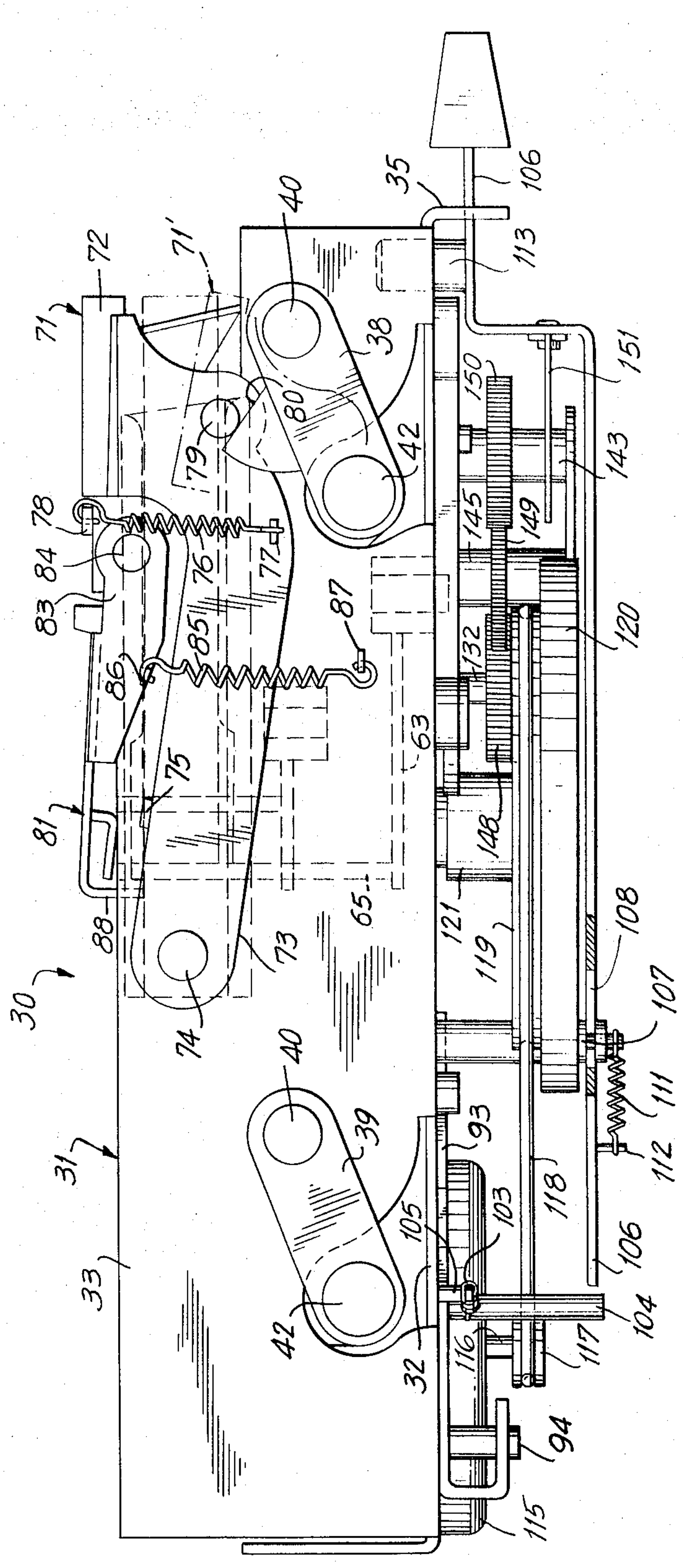
FIG. 5 is a side elevational view of the apparatus shown on FIG. 4.
Figure 6:
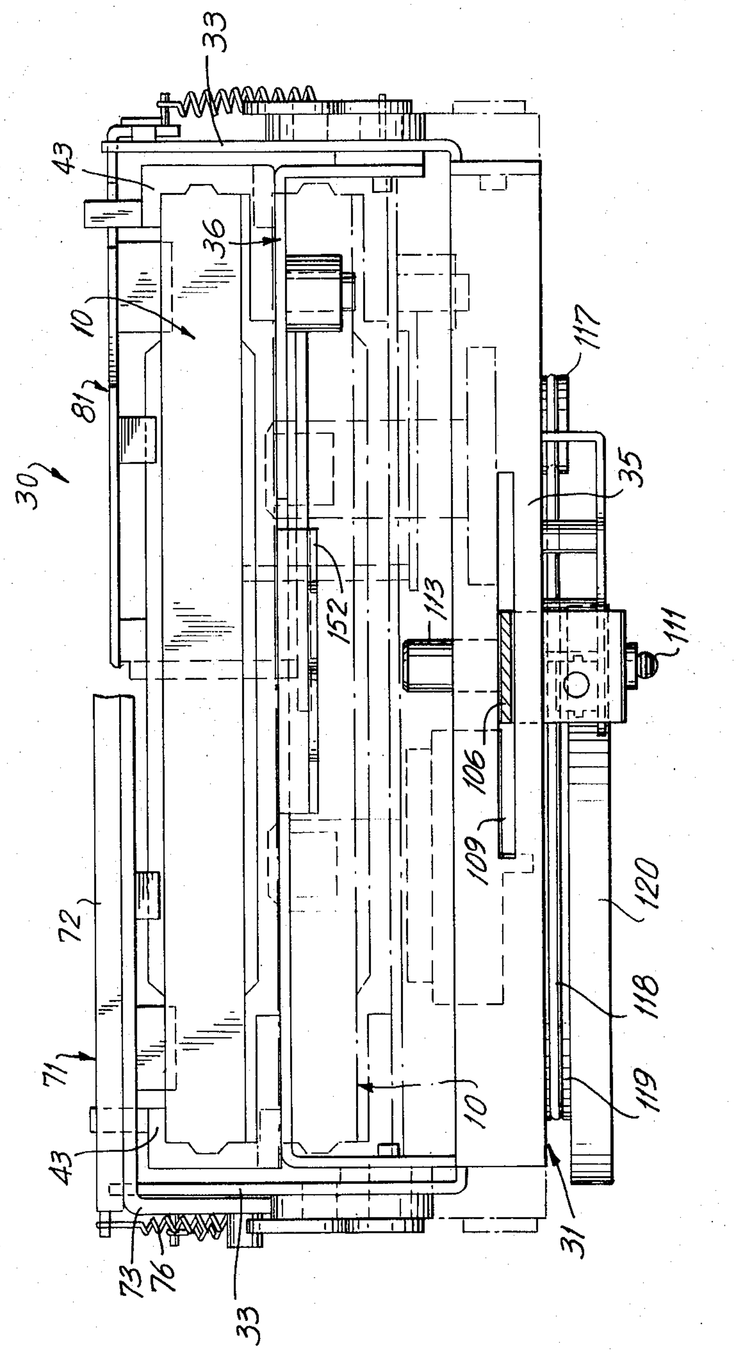
FIG. 6 is a front end elevational view of the apparatus appearing on FIGS. 4 and 5.

Referring now to FIGS. 4, 5 and 6, it will be seen that an apparatus 30 for recording and/or reproducing signals on the magnetic tape contained in cassette 10 includes a chassis 31 having a horizontal base plate 32, side walls 33 and a back wall 34 directed upwardly from base plate 32, and a depending flange 35 along the front edge of base plate 32. A frame 36 including a horizontal plate 37 is mounted on chassis 31 for movement relative to the latter in a substantially inclined path that extends downwardly and towards the front of the chassis, that is, toward the right on FIG. 5, from an elevated position, shown on FIG. 4 and in full lines on FIG. 6, to a lowered operative position, shown on FIG. 7 and in broken lines on FIGS. 6 and 8. The mounting of frame 36 on chassis 31 for movement in the described inclined path may be effected, as shown, by means of pairs of spaced front and back links 38 and 39 disposed at opposite sides of the chassis and each being pivotally connected, at one end, to the adjacent side wall 33 of the chassis, as by a pin 40, and at its other end, to an ear 41 depending from frame plate 37, as by a pin 42. As shown on FIG. 5, the paired front and back links 38 and 39 at each side of the chassis are arranged so as to extend rearwardly from the respective pivot pins 40 when frame 36 is in its elevated position, and to swing downwardly and forwardly to a downwardly directed position, FIG. 8, in connection with the shifting of frame 36 from its elevated position to its lowered operative position.

A pair of elongated cassette holding guides 43 are secured on top of frame plate 37 along the opposite sides of the forward portion of the latter and have generally U-shaped cross-sections arranged so as to open inwardly toward each other and also forwardly so as to slidably receive the side edge portions of a cassette 10 when the latter is inserted horizontally over the front of frame plate 37.

A magnetic head 44 for reproducing, or for recording and reproducing signals on the tape 14 in a cassette 10 is secured at a substantially central location on the back portion of frame plate 37, and a pinch roller assembly 45 is also mounted on frame plate 37 to one side of head 44. As shown, pinch roller assembly 45 may include a pinch roller 46 rotatably carried by a lateral arm 47 pivoted on a pin 48 extending from frame plate 37 and being urged forwardly against a stop 49 by means of a hair spring 50 which extends about a pin 51 and has its opposite ends bearing against arm 47 and received in an opening 52 in frame plate 37.

The forward portion of frame plate 37 has a pair of elongated openings 53 and 54 which are laterally spaced from each other in the forward portion of frame plate 37 between cassette holding guides 43 to loosely receive reel shafts 55 and 56 which are suitably journalled in, and extend upwardly from base plate 32 of chassis 31. Frame plate 37 further has an opening 57 spaced rearwardly from opening 53 and dimensioned to permit the extension therethrough of a capstan 58 which is suitably journalled in, and projects upwardly from base plate 32, and of a fixed guide pin 59 also extending upwardly from base plate 32. A second fixed guide pin 60 extends upwardly from base plate 32 so as to be located symmetrically with respect to guide pin 59 about the longitudinal medial line of the loading mechanism, and such guide pin 60 projects upwardly through an opening 61 in frame plate 37.

A cassette blocking and ejecting member 62 is carried by movable frame 35 and may include an arm 63 located under frame plate 37 and pivoted, at one end, on a pin 64 depending from plate 37 adjacent one side thereof. Blocking and ejecting member 62 further includes a vertical pin 65 extending upwardly from the free end of arm 63 substantially above frame plate 37 and being freely movable within opening 61 and a forwardly directed arcuate extension 66 of such opening. Arm 63 is yieldably urged in the counterclockwise direction, as viewed on FIG. 4, that is, to move pin 65 forwardly relative to frame 36, for example, by means of a spring 67 connected to arm 63 and to an anchor tab 68 depending from frame plate 37.

Movable frame 36 is yieldably urged to its elevated, and hence rearmost position relative to chassis 31, for example, by a tension spring 69 having its opposite ends connected to back wall 34 of chassis 31 and to a lug 70 formed on the rear edge of frame plate 37. In order to effect movement of frame 36 to its lowered operative position, apparatus 30 includes a frame lowering member 71 having a handle portion 72 extending laterally across the front portion of chassis 31 and arms 73 extending laterally across the front portion of chassis 31 and arms 73 extending rearwardly from the opposite ends of handle portion 72 at the outer sides of chassis side walls 33. The rearward ends of arms 73 are pivotally mounted on pins 74 carried by the adjacent side walls 33, and arms 73 and handle portion 72 are urged upwardly to the position shown in full lines on FIG. 5 and determined by the engagement of one of the arms 73 with a stop 75 extending from the adjacent side wall 33, for example, by a light tension spring 76 extending upwardly from an anchor 77 struck from one of the arms 73 to a tab 78 extending from the upper edge of the adjacent side wall 33. Pins 79 project from the forward end portions of arms 73 and are engageable, from above, with surfaces 80 formed on the adjacent front links 38 (FIG. 5). Thus, when handle portion 72 of member 71 is pressed downwardly, the resulting downward movement of pins 79 in engagement with the surfaces 80 on the underlying front links 38 causes such links to swing downwardly and forwardly from the position shown on FIG. 5 to the position shown on FIG. 8, and causes the resulting movement of frame 36 downwardly and forwardly from its elevated position to its lowered operative position. Pg,10

Figure 11:
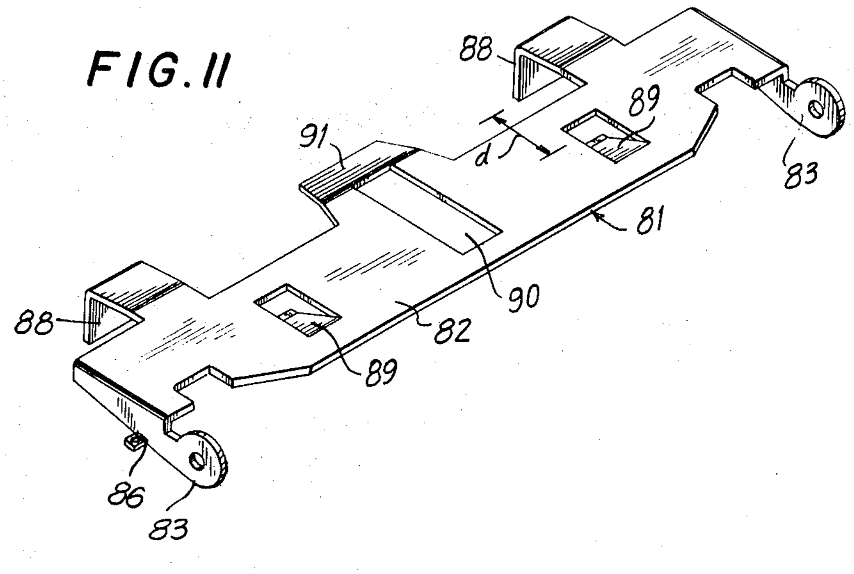
FIG. 11 is a perspective view of a cassette locating member which is included in the cassette loading mechanism according to this invention.

The cassette loading mechanism of apparatus 30 further includes an overhead cassette locating member 81 which is disposed above movable frame 36 in the elevated position of the latter and which is engageable with a cassette 10 slidably received by the cassette holding guides 43 for limiting the rearward movement of the cassette relative to chassis 31. As shown particularly on FIG. 11, the locating member 81 is generally in the form of a laterally elongated plate 82 having downwardly bent arms 83 extending forwardly from the opposite ends of plate 82 and being pivoted, at their forward ends, on pivot pins 84 (FIGS. 5 and 7) which are carried by side walls 33 adjacent the top edges of the latter. Thus, plate 82 extends laterally between side walls 33 and is yieldably urged downwardly to rest on the top edges of side walls 33, for example, by a tension spring 85 (FIG. 5) extending downwardly from an anchor tab 86 on one of the arms 83 to an anchor tab 87 fixed on the adjacent side wall 33. The plate 82 has stop elements extending downwardly from its rearward edge so as to be engageable with the rear edge of a cassette when the latter is inserted in guides 43 of frame 36 with the latter in its elevated position. The stop elements 88 are located so that, upon engagement of such stop elements with the rear edge of a cassette for limiting the rearward movement of the latter in guides 43, the cassette will be disposed with one or the other of its apertures 23 approximately in vertical registry with the capstan 58, with its apertures 24 approximately in vertical registry with the locating pins 59 and 60, and with its reel shaft receiving apertures 15 and 16 approximately in vertical registry with the shafts 55 and 56.

Referring again to FIG. 11, it will be seen that plate 82 of locating member 81 further has downwardly and rearwardly inclined tabs or stop elements 89 struck therefrom and located so that the rearward distance *d* from the free end edge of each tab 89 to each stop element 88 is slightly larger than the distance D (FIG. 1) across each of the raised plateaus 25 of cassette casing 11 from the edge wall 20 of the casing to the shoulder 26 defined by the plateau. When a cassette 10 is horizontally inserted between guides 43 and moved rearwardly along the latter with the edge wall 20 of the cassette casing located at the rear thereof, the upwardly facing plateau 25 on the cassette casing is slidably engaged by the downwardly struck stop elements 89 on plate 82 so that the latter is deflected upwardly against the small force of spring 85 until the rear edge 20 of the cassette comes into engagement with stop elements 88, whereupon the free end edges of stop elements 89 engage in front of shoulder 26 and thereby lock the cassette 10 against forward removal from guides 43. Thus, when a cassette 10 is properly inserted in the loading mechanism with the frame 36 in its elevated position, the stop elements 88 and 89 of locating member 81 are engageable with the cassette casing, as described, for locating the cassette, in both the forward and rearward directions.

Further, plate 82 of locating member 81 has an elongated slot 90 formed centrally therein and, when frame 36 is in its elevated position, slot 90 initially receives the upwardly projecting pin 65 (FIG. 4) which is urged against the forward end of slot 90 by the action of spring 67 on arm 63. Pin 65 is vertically dimensioned so that, with frame 36 in its elevated position, the upper end portion of pin 65 is releasable from slot 90 of locating member 81 only when the latter is deflected upwardly by the engagement of its downwardly inclined stop elements 89 with the upwardly facing plateau 25 on a cassette 10 slidably moved between guides 43 toward stop elements 88.

Thus, if a cassette is incorrectly inserted between guides 43, that is, inserted with its edge wall 20 facing forwardly so that the cassette openings 23 and 24 and the plateaus 25 are in the forward portion of the inserted cassette, rearward movement of the incorrectly positioned cassette causes pin 65 to move rearwardly along slot 90 until the pin engages the back end of slot 90, as indicated at 65′ on FIG. 4, whereupon the pin 65 blocks further rearward movement of the cassette prior to the engagement of downwardly inclined stop elements 89 with the upwardly facing plateau 25 on the cassette. Upon release of the rearward pressure exerted manually on the incorrectly inserted cassette, the spring 67 returns pin 65 forwardly along slot 90 and thereby forwardly propels the incorrectly inserted cassette out of guides 43. On the other hand, when the cassette is properly inserted, that is, inserted with its longitudinal edge wall 20 facing rearwardly, stop elements 89 of locating member 81 engage the upwardly facing plateau 25 of the cassette prior to the movement of pin 65 to the position indicated at 65′ on FIG. 4, and thus upwardly deflect locating member 81 to release the upper end of pin 65 from slot 90 and thereby permit further rearward movement of the cassette until its rearwardly facing edge wall 20 engages stop elements 99. The central back edge portion 91 of plate 82 is located a small distance forwardly with respect to stop elements 88 so that, when a cassette is moved against stop elements 88, pin 65 is moved rearwardly out from under plate 82, for example, to the position indicated at 65″ on FIG. 4, whereby the upper end of pin 65 does not interfere with the return of locating member 81 to its normal position resting on the upper edges of side walls 33 of the chassis, and hence does not interfere with the engagement of the end edges of stop elements 89 in front of the shoulder 26 defined by the upper plateau 25 on the cassette.

As previously noted, the distance d between the end edges of stop elements 89 and the front faces of the stop elements 88 is slightly greater than the distance D across the plateau 25 on cassette casing 11 so that, when the cassette is inserted, as described above, to dispose stop elements 89 in front of shoulder 26 of the upwardly facing plateau 25, the cassette is free to be moved a small distance in the forward and rearward directions. The central back edge portion 91 of plate 82 is located with respect to the end edges of stop elements 89 so that, when shoulder 26 of the upwardly facing plateau 25 is closely engaged by the end edges of stop elements 89, central back edge portion 91 projects rearwardly beyond the longitudinal edge wall 20 at the back of the casing. Such end edges of stop elements 89 are located so that, when shoulder 26 on the cassette casing is closely engaged therewith, the cassette will be disposed with one of its apertures 23 in precise vertical registry with capstan 58 and with its apertures 24 and apertures 15 and 16 precisely in vertical registry with the locating pins 59 and 60 and with the shafts 55 and 56, respectively.

After a cassette 10 has been properly inserted in guides 43 and moved rearwardly for positioning by locating member 81, handle 72 is depressed to effect movement of frame 36 in the downwardly and forwardly inclined path from its elevated position to its lowered operative position. At the initiation of such movement of frame 36, and while shoulder 26 of the upwardly facing plateau 25 on the cassette casing 11 is still engageable by stop elements 89, the upper end of pin 65 is moved below the central back edge portion 91 of plate 82, and thus is released for movement by spring 67 forwardly against edge wall 20 of the cassette casing, whereby to press the shoulder 26 against stop elements 89 for precisely locating the various apertures of the cassette with respect to reel shafts 55 and 56, capstan 58 and locating pins 59 and 60 which enter the corresponding apertures of the cassette in response to further downward movement of the latter with guides 43. By reason of the engagement of shafts 55 and 56, capstan 58 and locating pins 59 and 60 in corresponding apertures of the cassette 10, the latter is held against forward or rearward displacement during the continued downward movement of the cassette in response to the downward and forward movement of frame 36 toward its lowered operative position. Since the cassette 10 is moved vertically downward while frame 36 is moved downwardly and forwardly to its operative position, head 44 and pinch roller assembly 45 are displaced forwardly with respect to cassette 10 so that, when frame 36 attains its lowered operative position, head 44 engages tape 14 exposed at aperture 21 of the cassette casing, and pinch roller 46 enters one or the other of the cassette apertures 22 and presses the tape there exposed against capstan 58.

In order to hold frame 36 in its lowered operative position against the force of spring 69, the loading mechanism of apparatus 30 has a releasable latch device 92 (FIG. 9) that includes a latch lever 93 pivoted at its back end on a pin 94 depending from base plate 32 of chassis 31. The forward end portion of latch lever 93 has an inclined surface 95 at one side leading to a forwardly facing keeper surface 96 which is engageable with a pin 97 depending from frame 36 through a slot 98 (FIG. 7) in base plate 32. Pin 97 of latch device 92 is mounted at one end of a lever 99 (FIG. 9) which extends laterally under frame plate 37 and is pivotally mounted, at its other end, on a pin 100 depending from frame plate 37. An extension *97a* of pin 97 extends upwardly from lever 99 through an elongated opening 101 in frame plate 37 (FIG. 4) and is normally held against the back end of opening 101 by means of a spring 102 which is connected between pin extension *97a* and the spring anchor lug 70 at the back edge of frame plate 37. Latch lever 93 is yieldably urged laterally against pin 97 by means of a spring 103 (FIG. 9) extending between a vertical pin 104 carried by latch lever 93 and an anchor pin 105 depending from base plate 32. Thus, as movable frame 36 is displaced downwardly and forwardly from its elevated position to its lowered operative position, pin 97 rides forwardly along inclined edge surface 95 on latch lever 93 to angularly displace the latter in the counterclockwise direction, as viewed on FIG. 9, until pin 97 rides off inclined surface 95 and is engaged in front of keeper surface 96. The force of spring 102 which maintains pin extension *97a* against the back end of opening 101 is substantially greater than the force of spring 69 which urges frame 36 to return towards its elevated position and, therefore, the engagement of keeper surface 96 of latch lever 93 with pin 97 is effective to hold frame 36 in its lowered operative position until such time as latch lever 93 is laterally displaced to release its keeper surface 96 from pin 97.

Figure 7:
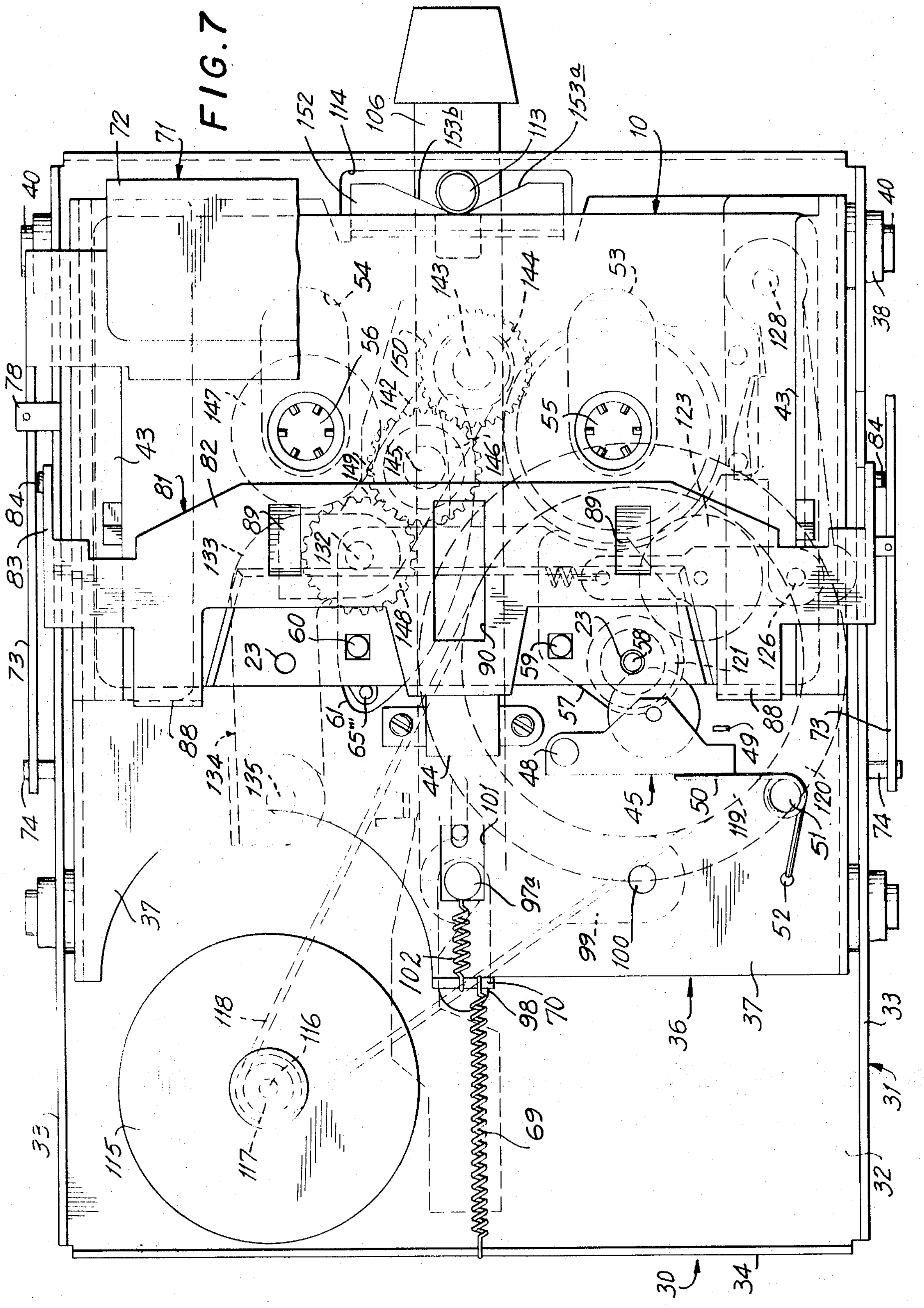
FIG. 7 is a view similar to that of FIG. 4, but showing the cassette loading mechanism conditioned for disposing a cassette at its operative position.
Figure 8:
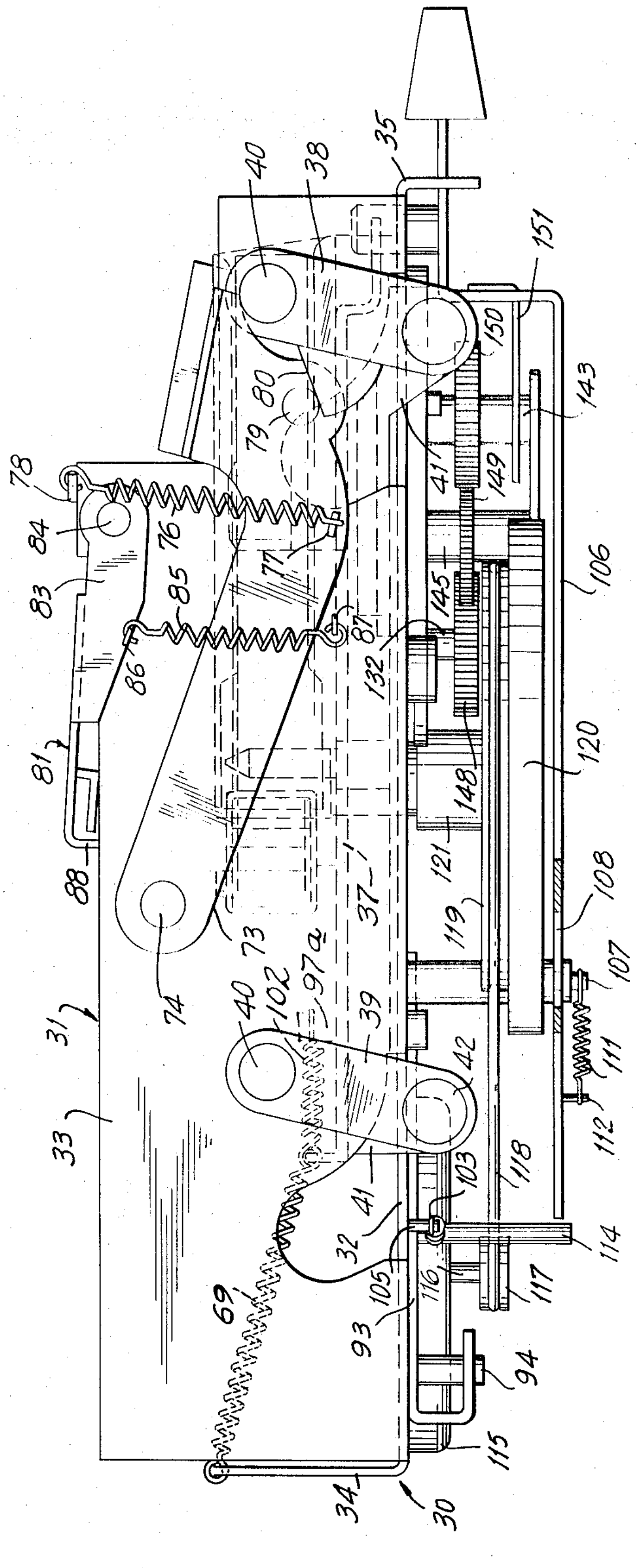
FIG. 8 is a view similar to that of FIG. 5, but showing the cassette loading mechanism in the position of FIG. 7.

In order to effect release of latch device 92, the loading mechanism of apparatus 30 is shown to further include an elongated control member 106 extending longitudinally under base plate 32 and being longitudinally movable with respect to chassis 31. Control member 106 is mounted for such movement with respect to the chassis by means of a pin 107 (FIGS. 5,8 and 9) which depends from base plate 32 and is slidably received in an elongated slot 108 formed in the back end portion of control member 106. Further, the forward end portion of control member 106 is slidably received in a laterally elongated slot 109 formed in the depending flange 35 at the front end of chassis 31 (FIG. 6). The back end of control member 106 has an oblique or angled edge surface 110 (FIG. 9) which, when control member 106 is moved longitudinally in the rearward direction, that is, toward the left as viewed on FIG. 9, acts on pin 104 to laterally deflect latch lever 93 about pivot pin 94 in the counterclockwise direction, that is, in the direction for releasing keeper surface 96 from pin 97, whereupon frame 36 is freed for movement by spring 69 back to its elevated position. Control member 106 is yieldably urged in the forward direction, as by a spring 111 connected between pin 107 and an anchor tab 112 depending from member 106 (FIGS. 5 and 8), and the spring urged forward movement of control member 106 is limited by the engagement of a pin 113 which projects upwardly from the front end portion of member 106 against the front edge of a generally T-shaped slot 114 formed in base plate 32 of the chassis adjacent the front of the latter (FIGS. 4, 7 and 9).

Figure 9:
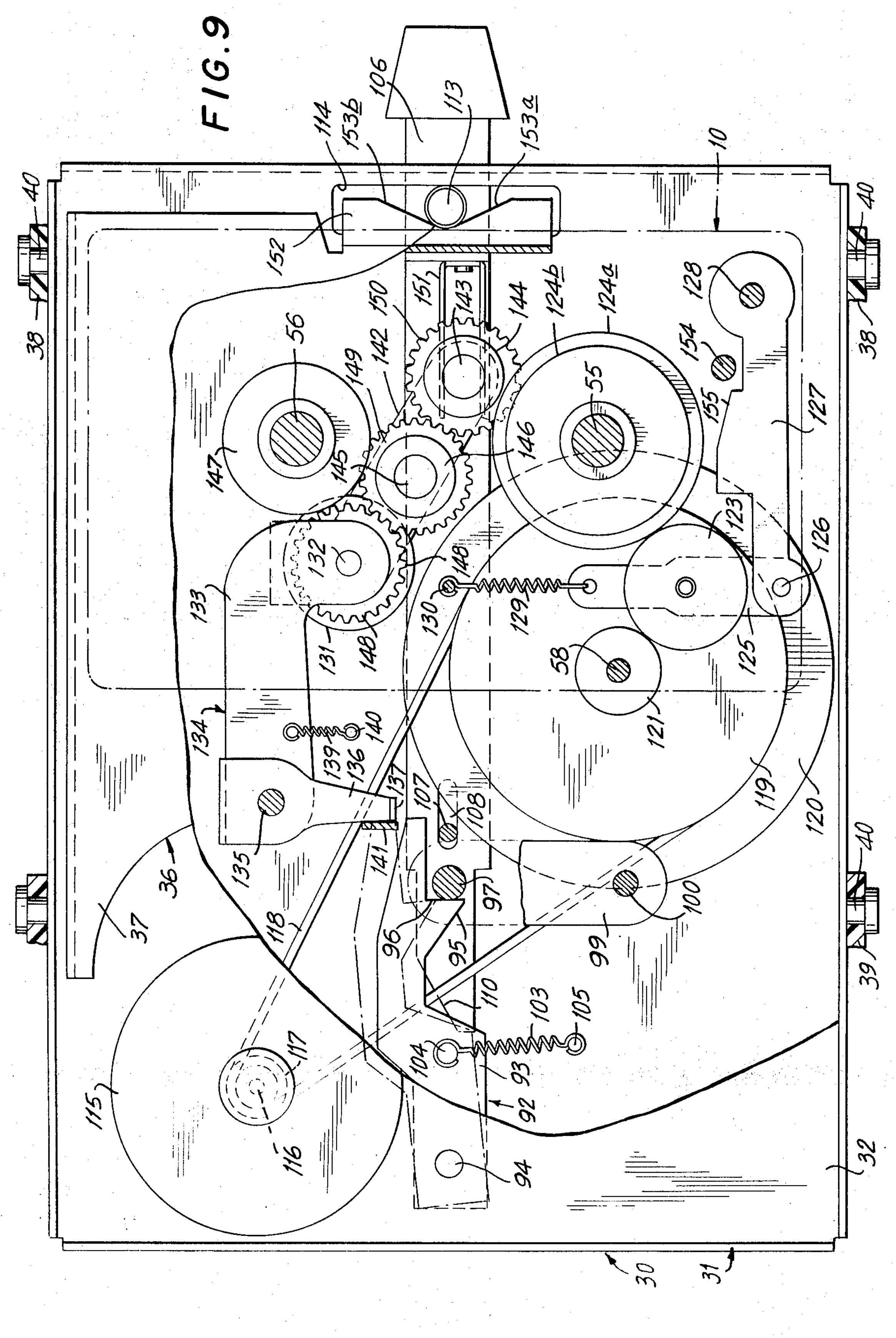
FIG. 9 is a plan view of the recording and/or reproducing apparatus showing elements thereof disposed below the chassis which is partly broken away for that purpose.

Referring specifically to FIG. 9, it will be seen that the drive assembly of apparatus 30 includes an electric motor 115 mounted on base plate 32 and having its shaft 116 extending therebelow and carrying a drive pulley 117. A belt 118 extends around drive pulley 117 and a pulley 119 which is integral with a fly wheel 120 secured to the capstan 58 below base plate 32. Thus, capstan 58 is rotated by motor 115 through pulleys 117 and 119 and drive belt 118. A drive wheel 121 is secured on capstan 58 immediately above pulley 119 and is peripherally engageable with a rotatable idler wheel 123 which is, in turn, peripherally engageable with a wheel 124*a* secured to reel shaft 55. Idler wheel 123 is shown to be rotatably mounted on a laterally extending link 125 which, at its outer end, is mounted on a pivot pin 126 carried by the back end of an arm 127 having its forward end pivotally mounted on a pin 128 depending from base plate 32. Link 125 is urged laterally inward to peripherally engage idler wheel 123 with the peripheries of wheels 121 and 124*a*, as shown on FIG. 9, for example, by a spring 129 connected between the inner end of link 125 and an anchor pin 130 depending from base plate 32. Thus, when frame 36 is moved to its lowered operative position, as shown on FIG. 9, the operation of motor 115 causes rotation of capstan 58 to drive the tape 14 engaged between capstan 58 and pinch roller 46, and further reel shaft 55 is rotated at a normal speed through engaged wheels 121, 123 and 124*a*, whereby to rotate the takeup reel in the cassette 10 for winding the tape on the takeup reel as the tape is driven by the capstan 58.

The drive assembly of apparatus 30 is further shown to comprise an idler wheel 131 which is peripherally engageable with the fly wheel 120 and which is rotatable on a shaft 132 journalled in an end portion of one arm 133 of a bell crank 134. Bell crank 134 is disposed below base plate 32 and is rockable on a pivot 135 depending from the base plate. Bell crank 134 further has an arm 136 extending laterally inward from pivot 135 and terminating in an upstanding lug 137 which projects upwardly through a slot 138 (FIG. 10) in base plate 32. A spring 139 (FIG. 9) is connected between bell crank 134 and an anchor 140 depending from base plate 132 to urge bell crank 134 in the clockwise direction, as viewed on FIG. 9, and hence to urge idler wheel 131 against the periphery of fly wheel 120. However, a lug 141 depends from frame plate 37 in back of the upstanding lug 137 and, when frame 36 is moved to its lowered operative position, lug 141 acts forwardly against lug 137 to rock bell crank 134 in the counterclockwise direction to the position shown on FIG. 9, whereby to space idler wheel 131 from the periphery of fly wheel 120.

The drive assembly of apparatus 30 is further shown to comprise a link 142 pivotally mounted, at one end, on shaft 132 and extending generally forwardly therefrom. A shaft 143 is rotatably mounted in the forward end portion of link 142 and carries an idler wheel 144 that is peripherally engageable with a wheel 124*b* that is also fixed on reel shaft 55. Link 142, intermediate its ends, further carries a shaft 145 on which an idler wheel 146 is rotatable so as to be engageable peripherally with a wheel 147 fixed on reel shaft 56. Successively meshing gears 148, 149 and 150 are mounted on shafts 132, 145 and 143 and rotatably coupled with the respective wheels 131, 146 and 144. Thus, when idler wheel 131 is rotated by peripheral engagement with fly wheel 120, as hereinafter described, meshing gears 148, 149 and 150 cause corresponding rotational movements of wheels 146 and 144. Link 142 is angularly positioned with respect to bell crank 134, whereby to control the peripheral engagement of wheels 144 and 146 with wheels 123*b* and 147, respectively, by means of a U-shaped spring member 151 which is fixed to control member 106 and embraces shaft 143. So long as the front end portion of control member 106 is laterally centered in slot 109, whereby to position pin 113 at the middle of the T-shaped slot 114, as shown on FIGS. 4,7 and 9, spring 151 angularly positions link 142 to space wheels 144 and 146 from the peripheries of wheels 124*b* and 147, respectively, as particularly shown on FIG. 9. However, when the front end portion of control member 106 is laterally displaced from its centered position, for example, to one or the other of the displaced positions indicated at 106′ and 106″ on FIG. 10, spring 151 effects corresponding angular displacement of link 142 for engaging wheel 144 with wheel 124*b*, or for engaging wheel 146 with wheel 147.

It will further be seen that a cam member 152 projects forwardly from the center of frame plate 37 so as to overlie T-shaped slot 114 when frame 36 is moved to its lowered operative position. Cam member 152 has rearwardly converging, oblique forward edge portions 153*a* and 153*b* between which pin 113 is centered when control member 106 is in its central position and frame 36 is moved to its lowered operative position. However, when the forward end portion of control member 106 is displaced laterally from its central position to one or the other of the positions indicated at 106′ and 106″ on FIG. 10, pin 113 rides along oblique edge portion 153*a* or 153*b* of cam member 152 and thereby displaces frame 36 a small distance rearwardly from its lowered operative position for moving lug 141 rearwardly away from lug 137 and thereby permitting spring 139 to turn bell crank 134 in the direction to engage idler wheel 131 with the periphery of fly wheel 120. Such small rearward displacement of frame 36 is made possible, without release of latch device 92, by reason of the fact that the latch pin 97 is carried by the pivoted arm 99 which rocks slightly against the action of spring 102 in response to the described small rearward displacement of frame 36.

Figure 10:
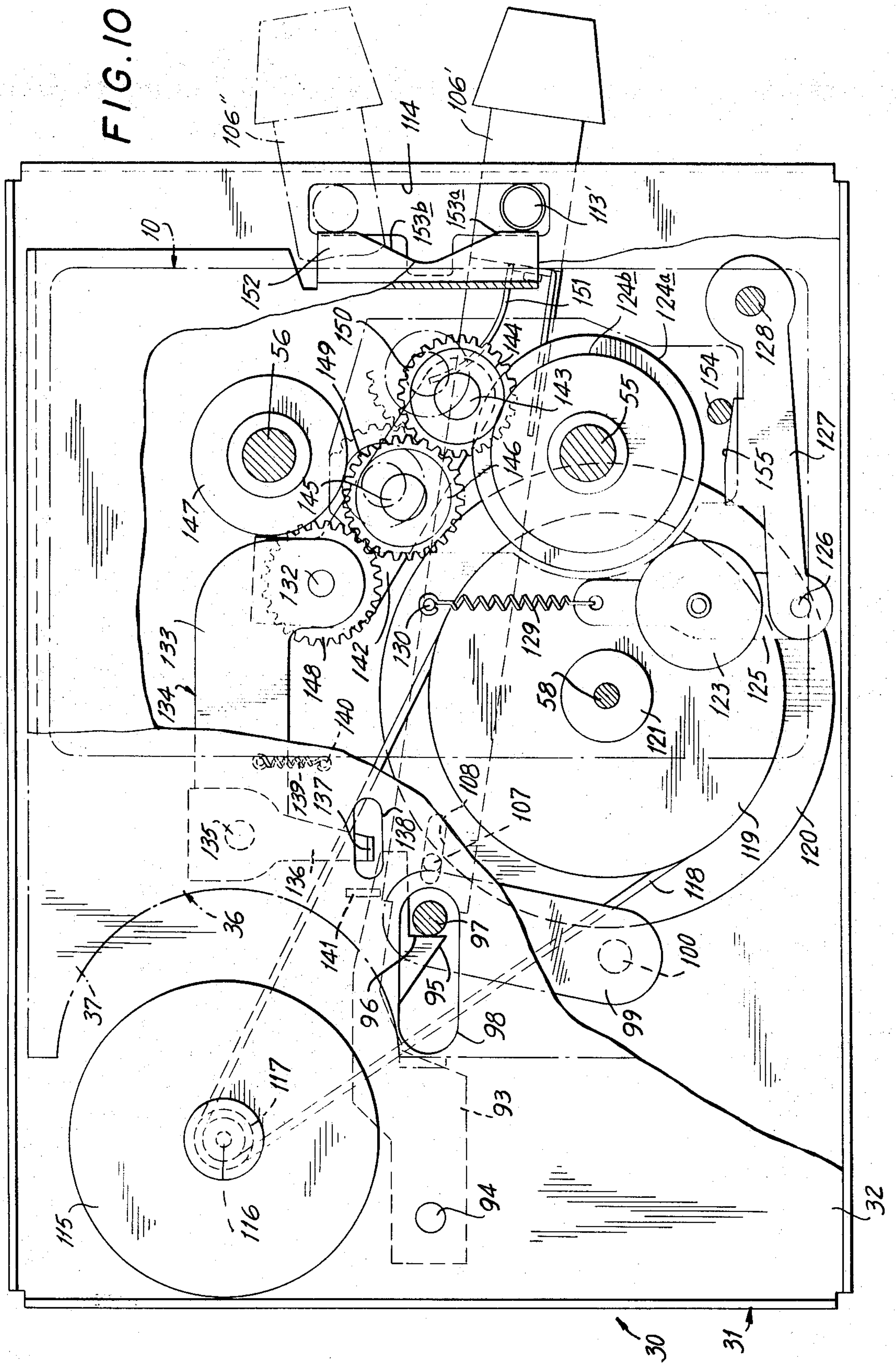
FIG. 10 is a plan view similar to that of FIG. 9, but showing the illustrated elements in the positions thereof for effecting fast forwarding and rewinding operations of the tape drive.

The rearward displacement of frame 36 resulting from the movement of pin 113 along one or the other of the oblique edge positions 153*a* or 153*b* further causes a pin 154 which depends from frame plate 37 to move from the position shown on FIG. 9 rearwardly to the position shown on FIG. 10. During such movement of pin 154, the latter acts against an oblique cam surface 155 on arm 127 to rock the latter outwardly, that is, in the counterclockwise direction to the position shown on FIG. 10. Such rocking of arm 127 moves link 125 laterally outward for disengaging idler wheel 123 from the peripheries of wheels 121 and 124*a*.

Figure 12:
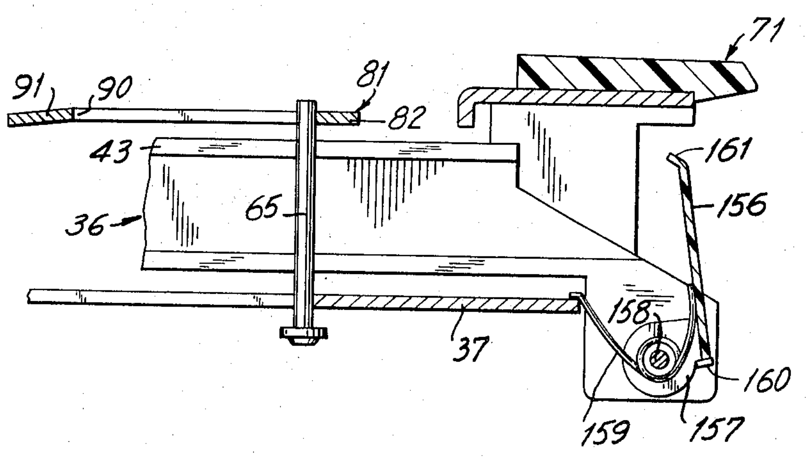
FIGS. 12 and 13 are detailed sectional views illustrating a closure included in the cassette loading mechanism and the manner in which such closure is effective to limit the extent to which a casette is ejected from the loading mechanism.
Figure 13:
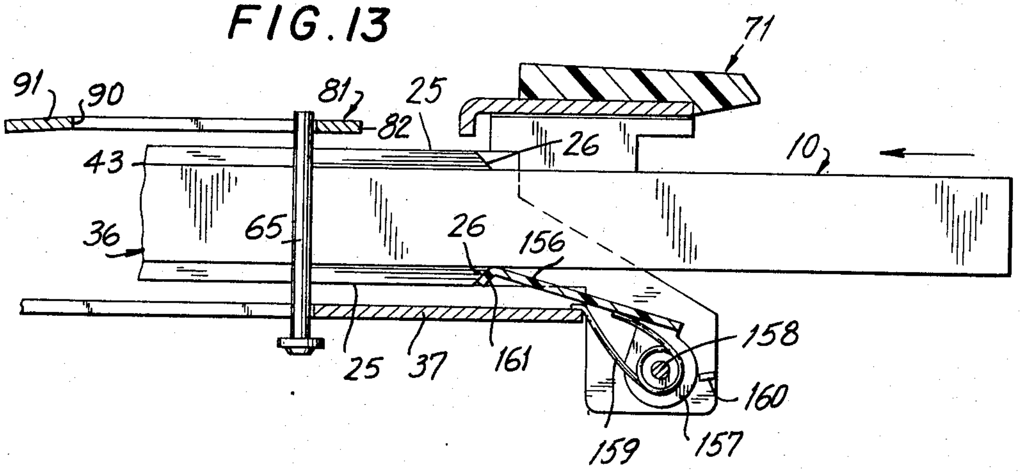

Referring now to FIGS. 12 and 13, it will be seen that the apparatus 30 in accordance with this invention preferably has a closure door 156 extending across the opening provided at the front of frame 36 between the cassette holding guides 43. The door 156 is nromally urged to an erect position (FIG. 12) and is hingedly mounted about a lateral axis extending substantially along the lower edge of the door for swinging rearwardly and downwardly from such erect position when a cassette 10 is pushed rearwardly past door 156 along guides 43, for example, as shown on FIG. 13. In the embodiment shown, the opposite ends of door 156 have lugs 157 extending therefrom adjacent the lower edge of the door and formed with openings that receive pivot pins 158 carried by the forward ends of guides 43 at the bottom of the latter, and hair springs 159 are provided on pivot pins 158 and have their opposite ends bearing against door 156 and frame plate 37 to urge door 156 to its erect position (FIG. 12) where the lower edge of the door bears against a stop 160 extending from the adjacent guide 43. It will be understood that, when a cassette 10 is inserted in guides 43, the upper or free edge of door 156 slidably bears against the bottom surface of the cassette for a purpose that will be apparent in the following description of the operation of apparatus 30.

The above described apparatus 30 in accordance with this invention operates as follows:

Loading of a Cassette

Starting with frame 36 in its elevated position and control member 106 centered in slot 109, a cassette 10 is inserted rearwardly between guides 43 past closure door 156. Assuming that the cassette 10 is properly inserted, that is, inserted with its edge wall 20 at the back of the cassette, such edge wall displaces pin 65 rearwardly along slot 90 and, as pin 65 nears the back end of slot 90, stop elements 89 of overhead locating member 81 are engaged by the raised plateau 25 at the top of the cassette to cause upward deflection of member 81 and thereby permit pin 65 to continue its rearward movement beyond the back end of slot 90. As previously described, if the cassette 10 is incorrectly inserted, that is, inserted with its edge wall 20 at the front thereof, overhead locating member 81 is not upwardly deflected and, therefore, pin 65 has its rearward movement blocked by the back end of slot 90 to prevent full insertion of the cassette in holding guides 43.

If the cassette is properly inserted, the rearward movement of the cassette may continue until edge wall 20 thereof contacts stop elements 88 and member 81 returns to its original position with the end edges of stop elements 89 engaging in front of the shoulder 26 at the top of the cassette. It will be apparent that, during such insertion of the cassette, only a small force need be applied to the cassette to overcome the relatively small force applied by spring 67 to resist the rearward displacement of pin 65.

With the cassette locked against forward displacement by reason of the engagement of stop elements 89 with shoulder 26, the loading operation is continued by pressing downwardly on handle 72 and thereby moving frame 36 downwardly and forwardly from its elevated position to its lowered operative position. During such movement of the frame 36, the force applied downwardly to handle 72 need only be sufficient to overcome the force of spring 69 which yieldably urges frame 36 to its elevated position and the light force exerted by spring 76 to elevate handle 72. During the movement of frame 36 downwardly and forwardly to its lowered operative position, the cassette 10 moves vertically downward in engagement with reel shafts 55 and 56, capstan 58 and guide pins 59 and 60, as specifically described above, and the magnetic head 44 and pressure roller assembly 45 on movable frame 36 are moved into operative positions with respect to the cassette.

During the concluding portion of the movement of frame 36 to its lowered operative position, latch pin 97 moves along oblique surface 95 on latch lever 93 to laterally deflect the latter until pin 97 moves in front of keeper surface 96, as shown on FIG. 9, so as to retain frame 36 in its lowered operative position. Further, the final increment of movement of frame 36 to its lowered operative position brings lug 141 against lug 137 to rock bell crank 134 against spring 139 and thereby space idler wheel 131 from the periphery of fly wheel 120. With frame 36 in its lowered operative position, pin 154 is positioned as shown on FIG. 9 so that spring 129 urges arm 127 and link 125 to the position shown where idler wheel 123 peripherally engages wheels 121 and 124*a*. Further, the central positioning of control lever 106 disposes link 142 so that idler wheels 144 and 146 are respectively spaced from the peripheries of wheels 124*b* and 147.

Forward Drive of the Tape at Normal Speed

With the frame 36 at its lowered operative position and control lever 106 in its central position, energizing of motor 115 effects rotation of capstan 58 through belt 118 and pulleys 117 and 119, and the pinch roller 46 presses the tape against capstan 58 for driving of the tape by the rotated capstan. Further, engagement of idler wheel 123 with wheels 121 and 124*a* transmits the rotary movement of capstan 58 to reel shaft 55 so that the latter effects rotation of the takeup reel within the casing at a normal speed which corresponds to the speed of tape drive by the capstan 58.

Fast Forward Operation

When the forward end portion of control lever 106 is laterally displaced from its central position to the position indicated at 106' on FIG. 10, the action of pin 113 against oblique edge portion 153*a* of cam member 152 causes a small rearward displacement of frame 36 so that lug 141 is moved away from lug 137 to permit spring 139 to rock bell crank 134 in the clockwise direction, as viewed on FIG. 10, whereby to engage idler wheel 131 with the periphery of fly wheel 120. The small rearward displacement of frame 36 further moves pin 154 against cam surface 155 on arm 127 to rock the latter and thereby move idler wheel 123 out of engagement with wheels 121 and 124*a*. Further, the lateral displacement of the front end portion of the control lever to the position indicated at 106' is transmitted to link 142 by spring 151, that is, link 142 is turned about shaft 132 in the clockwise direction, as viewed on FIG. 10, to engage wheel 144 with the periphery of wheel 124*b*. Thus, reel shaft 55 is rotated in the forward direction at a high speed through fly wheel 120 engaging idler wheel 131, meshing gears 148, 149 and 150, and wheel 144 peripherally engaging wheel 124*b*.

Rewind Operation

When the forward end portion of control member 106 is laterally displaced in the opposite direction from its central position, that is, to the position indicated at 106'' on FIG. 10, frame 36 is again displaced rearwardly a small distance by the engagement of pin 113 with oblique surface portion 153*b* of cam 152. Such displacement of frame 36 again causes engagement of idler wheel 131 with the periphery of fly wheel 120 and the disengagement of idler wheel 123 from wheels 121 and 124*a*. However, the lateral movement of the control member to position 106'' is transmitted through spring 151 to link 142 to rock the latter in the counterclockwise direction relative to shaft 132, and thus brings wheel 146 into peripheral engagement with wheel 147 on reel shaft 56. Thereafter, reel shaft 56 is rotated at high speed in the rewind direction through the engagement of idler wheel 131 with fly wheel 120, meshing gears 148 and 149, and the engagement of wheels 146 and 147.

It will be apparent that, during the fast forward operation or rewind operation of the apparatus 30, the described rearward displacement of frame 36 which is incidental to each of those operations is effective to move head 44 and pinch roller assembly 45 away from the tape in the cassette so that the tape is free to be moved at high speed without interference from the capstan 58 and pinch roller assembly 45 and without the frictional resistance and tape wear that would result from the engagement of the head 44 with the tape during the high speed movement thereof.

Cassette Ejection

When it is desired to eject a cassette from apparatus 30, control member 106 must be initially disposed in its central position, that is, the cassette cannot be ejected during a fast forward or rewind operation. With the control member 106 in its central position, the control member 106 is displaced longitudinally rearward, and such displacement is permitted by the movement of pin 113 into the stem portion of the T-shaped slot or aperture 114. During the rearward movement of control member 106, the oblique back end edge 110 thereof acts against pin 104 of latch device 92 to laterally displace latch lever 93 and thereby release pin 97 from keeper surface 96 of the latch lever. Upon such release of pin 97 from keeper surface 96, spring 69 is effective to return frame 36 rearwardly and upwardly to its elevated position. It will be apparent that the rearward displacement of control member 106 for initiating the return of frame 36 to its elevated position can be effected with a relatively small pressure sufficient merely to overcome the force of spring 111 acting on control member 106 and the force of spring 103 acting on latch lever 93.

During the rearward and upward movement of frame 36 back to its elevated position, the cassette 10 moves vertically upward on reel shafts 55 and 56, capstan 58 and guide pins 59 and 60. As frame 36 nears its elevated position, the upper end of pin 65 rises under the central back edge portion 91 of locating member 81 and thus deflects the latter upwardly to disengage stop elements 89 from shoulder 26 and thereby permit the action of spring 67 on pin 65 to displace the latter forwardly for propelling the cassette forwardly along guides 43.

As the cassette 10 is being propelled forwardly along guides 43 by spring urged pin 65, the free edge 161 of closure door 156 comes into engagement with the shoulder 26 at the bottom of cassette 10 and thereby arrests the cassette to avoid complete ejection of the cassette from the holding guides 43. Thereafter, the cassette 10 can be simply removed from holders 43 merely by grasping the forwardly projecting portion of the cassette and pulling the latter past the door 156.

Although an illustrative embodiment of this invention has been described indetail herein with reference to the accompanying drawings, it is to be understood that the invention is not limited to that precise embodiment, and that various changes and modifications may be effected therein without departing from the scope or spirit of the invention.

What is claimed is:

1. An apparatus for recording and/or reproducing signals on a magnetic-tape contained in a cassette, comprising a chassis, tape drive means projecting upwardly from said chassis for engagement with a cassette from below the latter, a movable frame, means mounting said frame on said chassis for movement relative to the latter in a substantially inclined path that extends downwardly and towards the front of said chassis from an elevated position to a lowered operative position, cassette holding means on said frame opening at the front of the latter for slidably receiving a cassette above said tape drive means when said frame is in said elevated position, means for shifting said frame from said elevated position to said lowered operative position, cassette locating means on said chassis engageable with a cassette slidably received in said holding means with said frame in said elevated position for disposing the cassette in vertical registry with said tape drive means therebelow and constraining the cassette to move vertically downward into engagement with said tape driving means while sliding relative to said frame upon said shifting of said frame to said lowered operative position, and a magnetic head fixed on said frame so as to be spaced rearwardly from a cassette in said holding means when said frame is in said elevated position and being engaged with the tape in the cassette in response to said relative sliding of the cassette and frame upon the shifting of said frame in said inclined path to said lowered operative position.

2. An apparatus according to claim 1; further comprising releasable latch means for holding said movable frame in said lowered operative position, and cassette ejecting means operative upon the return of said movable frame from said lowered position to said elevated position for propelling a cassette forwardly from said cassette holding means.

3. An apparatus according to claim 2; further comprising spring means yieldably urging said frame to said elevated position, and means for releasing said latch means to permit return of said frame from said lowered operative position to said elevated position by said spring means.

4. An apparatus according to claim 3; in which said tape drive means includes a capstan engageable with the tape contained in a cassette when said frame is in said lowered operative position, takeup reel and supply reel driving shafts engageable with corresponding reels in the cassette when said frame is in said lowered operative position, a motive power source, and transmission means for coupling said motive power source to said capstan and to said reel driving shafts and being shiftable to selectively drive said take-up reel shaft in a forward direction at normal and high speeds and to selectively drive said supply reel shaft at a high speed in a rewind direction; and in which said means for releasing said latch means includes a control lever movable longitudinally to release said latch means and also being shiftable laterally to either side from a centered position, and means connecting said control lever with said transmission means to condition the latter for driving said take-up reel in said forward direction at said normal speed when said control lever is in said centered position and to condition said transmission means for driving said take-up and supply reels, respectively, at said high speeds when said control lever is shifted laterally to the opposite sides, respectively, of said centered position.

5. An apparatus according to claim 4; further comprising pinch roller means on said frame engageable with the tape in a cassette to press the tape against said capstan when said frame is in said lowered operative position, and mutually engageable means on said control lever and frame operative to shift said frame rearwardly a small distance from said lowered operative position in response to lateral shifting of said control lever to either side from said centered position for disengaging said pinch roller means from the tape in a cassette.

6. An apparatus according to claim 1; in which said means mounting the frame on said chassis includes pairs of spaced links disposed at opposite sides of said chassis and each being pivotally connected, at its opposite ends, to said chassis and frame, respectively, to swing from a rearwardly directed position to a downwardly directed position in connection with the shifting of said frame from said elevated position to said lowered operative position.

7. An apparatus according to claim 1; in which said cassette locating means includes an overhead locating member disposed above said frame in said elevated position for engagement with a cassette slidably received by said holding means, and locating pins projecting upwardly from said chassis for entering corresponding openings in the cassette as the latter moves downwardly out of engagement with said overhead locating member in response to shifting of said frame toward said lowered operative position.

8. An apparatus according to claim 7; in which said overhead locating member is mounted on said chassis for limited, generally vertical movement with respect to the latter and includes depending rearwardly disposed first stop means engageable with the rear edge of a cassette slidably inserted in said holding means through the opening at the front of the latter for limiting the rearward sliding movement of the cassette in said holding means with said frame in said elevated position, and forwardly disposed depending second stop means arranged to ride over an upwardly raised plateau normally extending along the rear edge portion of the cassette, with consequent raising of said overhead locating member, during insertion of the cassette into said holding means and to engage in front of said plateau upon engagement of the cassette with said first stop means for limiting the forward movement of the cassette away from said first stop means.

9. An apparatus according to claim 8; further comprising a blocking member which is movably mounted so as to be interposed in the path of rearward movement of a cassette in said holding means, and means on said overhead locating member engageable with said blocking member to limit the rearward movement of the latter with a cassette inserted in said holding means except when said overhead locating member is raised by engagement of said second stop means with the plateau on the cassette, whereby to prevent full insertion of a cassette into said holding means with the raised plateau of the cassette at the front thereof.

10. An apparatus according to claim 9; in which said blocking member is spring urged in the forward direction for propelling a cassette forwardly from said holding means except when said second stop means comes into engagement with the raised plateau on a cassette, whereupon said spring urged blocking member holds the cassette against said second stop means.

11. An apparatus according to claim 10; in which said blocking member is mounted on said frame and, upon movement of said frame from said lowered operative position to said elevated position, acts on said overhead locating member to raise the latter and thereby permit the raised plateau of a cassette to pass under said second stop means for ejection of the cassette from said holding means by said spring urged blocking member.

12. An apparatus according to claim 11; further comprising a closure door for the opening at the front of said cassette holding means, said closure door being hingedly mounted to swing downwardly and rearwardly about an axis along the lower edge of said door upon the insertion of a cassette into said holding means, and spring means urging said door to an erect position so that, when a cassette is received in said holding means, the upper edge of said door bears against the lower surface of the cassette for engagement with a raised plateau projecting downwardly from the cassette along the rear edge portion of the latter, whereby to limit the extent of said ejection of the cassette from said holding means by said spring urged blocking member.

13. An apparatus according to claim 1; in which said means mounting the frame on said chassis includes pairs of spaced links disposed at opposite sides of said chassis and each being pivotally connected, at its opposite ends, to said chassis and frame, respectively, to swing from a rearwardly directed position to a downwardly directed position in connection with the shifting of said frame from said elevated position to said lowered operative position; and said means for shifting the frame includes an operating handle extending across said chassis above said frame and having arms extending from the opposite ends of said handle and being pivotally connected to adjacent sides of said chassis to permit substantially vertical displacement of said handle, and means on at least one of said arms engageable with at least one of said links from above to swing the engaged link downwardly from said rearwardly directed position in response to downward displacement of said operating handle.

* * * * *